Patented Feb. 17, 1942

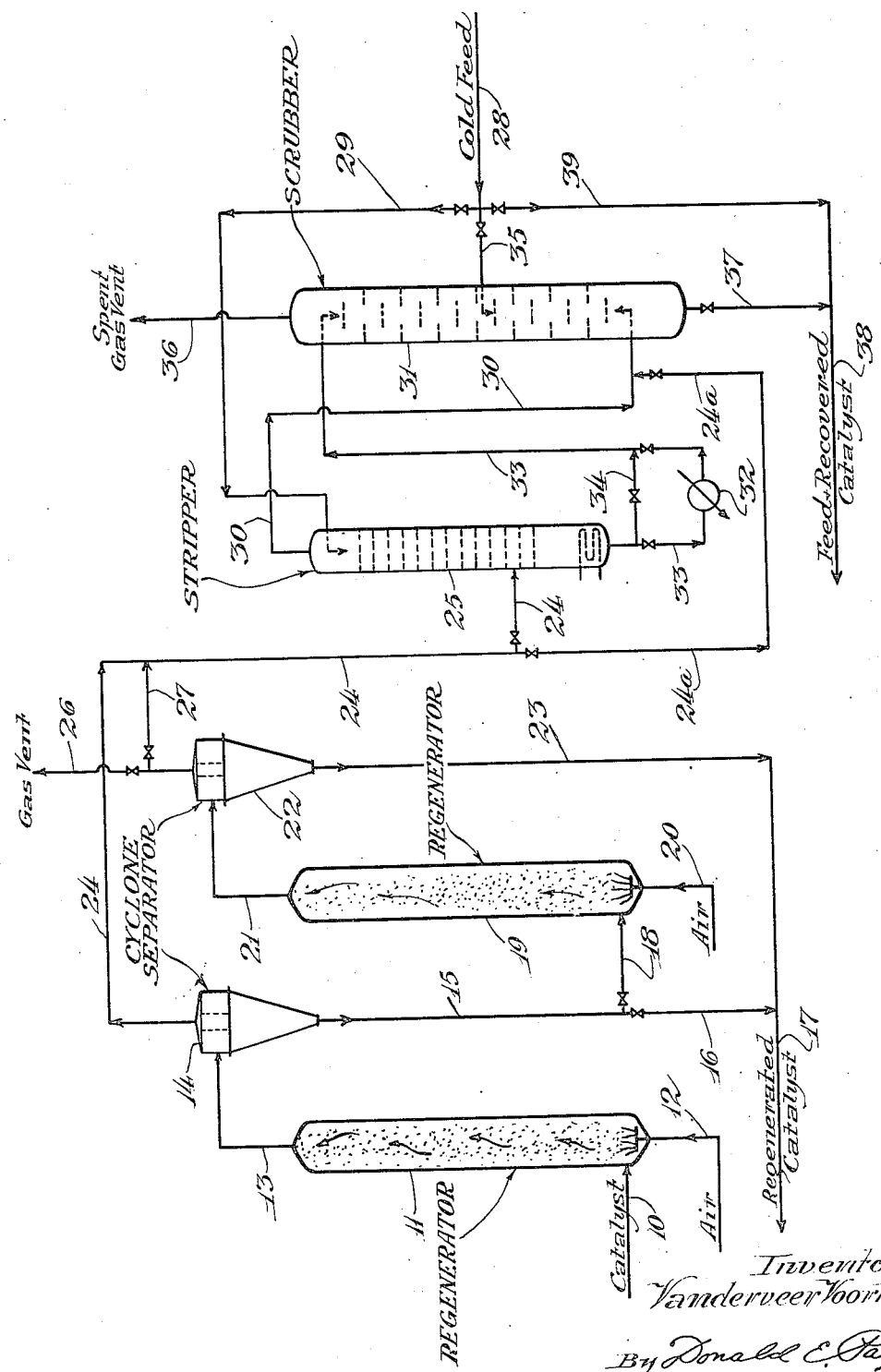

2,273,076

UNITED STATES PATENT OFFICE 2,273,076

POWDERED CATALYST REGENERATION AND RECOVERY

Vanderveer Voorhees, Homewood, Ill., assignor to Standard Oil Company, Chicago, Ill., a corporation of Indiana Application November 30, 1940, Serial No. 368,081

9 Claims. (Cl. 196—52)

This invention relates to a powdered catalyst system and it pertains more particularly to a system for the conversion of low quality naphtha, gas oils and heavier oils, into high quality motor fuel by means of a powdered catalyst which requires periodic regeneration.

In powdered catalyst systems for the production of high quality motor fuel by cracking, aromatization, hydrogenation, dehydrogenation, isomerization, alkylation, isoforming, etc. it is usually necessary that the catalyst be periodically regenerated by burning carbonaceous deposits therefrom. A primary object of my invention is to effect complete recovery of regenerated catalyst commonly lost from each conversion system as a fine dust. Another object of my invention is to provide an improved method and means for utilizing the heat liberated in this regeneration step. A further object is to provide an improved method and means for preheating the charging stock to such conversion process.

In such powdered catalyst conversion processes enormous amounts of catalyst must continuously be separated from regeneration gases and even though cyclone separators, electrical precipitators, etc. make possible the recovery of more than 99% of this catalyst, a considerable amount of catalyst has heretofore been lost with vented regeneration gases. In a 10,000 barrel per day catalytic cracking plant the catalyst losses from this source may amount to many tons of catalyst per day which involves a financial loss of from four or five hundred dollars or more per day. An object of my invention is to prevent all loss of catalyst with regeneration gases.

The powdered catalyst which is not removed from on-stream reaction vapors in the cyclone separators, etc. may be recovered by partially condensing the vapors, collecting all of the remaining catalyst in the condensate and recycling the condensate with recovered catalyst to the conversion step. The problem of separating catalyst from spent regeneration gases cannot be solved in this manner and no commercially feasible method has heretofore been developed for recovering the last traces of catalyst from regeneration gases. My invention is directed particularly to the solution of this problem and it provides a method and means whereby the final traces of catalyst in regeneration gases may be picked up in incoming feed stock so that the heat of the gases will preheat the said stock at the same time that catalyst material is being removed from the gases, all without substantial loss of said stock by vaporization.

A further object of my invention is to provide an improved system for scrubbing hot regeneration gases with charging stock wherein the scrubbing temperature may be sufficiently high to prevent the condensation of water from the gases and wherein means are provided for avoiding charging stock losses by vaporization. A further object is to provide a system whereby the coarser and hence more difficultly regenerable catalyst particles may be subjected to a second regeneration step in the absence of the finer and more readily regenerable particles and whereby the hot regeneration gases which are scrubbed with charging stock may be substantially free from excess oxygen. Other objects will become apparent as the detailed description of the invention proceeds.

My invention comprises an improved system for scrubbing the last traces of catalyst out of hot regeneration gases by means of the charging stock for a catalytic conversion system. In practicing my invention I fractionate at least a portion of the charging stock to obtain a relatively non-volatile fraction characterized by a very low vapor pressure, and I introduce this non-volatile stock at the top of my scrubber for the purpose of absorbing volatile components of the charging stock which would otherwise be lost with discharged regeneration gases. If ordinary gas oil is employed as the charging stock, the top of the scrubber must either be operated at relatively high pressures or at relatively low temperatures in order to prevent serious charging stock losses. Under such conditions water may condense in the scrubbing system and the removal of this water frequently leads to operating difficulties. I have devised a method of overcoming these difficulties by preparing a non-volatile fraction of the charging stock and introducing it at the top of the scrubber where it acts as an absorber oil for hydrocarbon vapors which would otherwise be lost from the system with the regeneration gases. By supplementing the ordinary scrubbing step with the heavy oil absorption step I can operate the scrubber with a top temperature sufficiently high to permit the elimination of water in the form of vapor or steam without suffering any appreciable oil losses.

The heat for the fractionation of the charging stock is preferably supplied by the hot regeneration gases themselves. A portion of the charging stock is stripped of its volatile components by means of the hot regeneration gases and the non-volatile residue either with or without cooling is used as the absorption oil in the scrubber.

The light volatile fractions are condensed by cold feed in the lower part of the scrubber, i. e., at a point below the introduction of the absorber oil.

The regeneration may be effected in either one or two stages but the two-stage system offers the advantage of segregating the catalyst fines, which require no further regeneration, in a substantially oxygen-free gas which may be scrubbed with charging stock as hereinabove described. The heavier catalyst particles may then be further regenerated with an excess of oxygen and since the fines have been removed, this coarse catalyst may be substantially completely separated from the oxygen containing regeneration gases in ordinary cyclone separators. The use of the two-stage system minimizes the amount of regeneration gases which requires scrubbing and thus increases the ratio of feed stock to gases. It also provides a means whereby the more difficultly regenerable catalyst particles are subjected to longer and more severe regeneration conditions than the lighter and more easily regenerable catalyst particles.

My invention will be more clearly understood from the accompanying drawing which forms a part of this specification and which constitutes a diagrammatic flow sheet of my system.

The invention is applicable to the regeneration of any solid catalyst particles, but it is particularly directed toward the regeneration of powdered catalyst which has become coated with carbonaceous deposits in hydrocarbon conversion processes, such as catalytic cracking, dehydrogenation, aromatization, reforming, isoforming, alkylation, polymerization, etc. For catalytic cracking the catalyst may be an acid treated bentonite clay or it may be a synthetic silica-alumina composition. Alumina, magnesia or a mixture of alumina and zirconia may be deposited on silica gel or other form of active silica. Alkali ions may be leached out of natural or synthetic zeolites or may be replaced by alumina in such zeolitic compositions. For aromatization of paraffinic and naphthenic hydrocarbons the catalyst may be a fifth or sixth group metal oxide such as molybdenum or chromium oxide deposited on activated alumina or acid treated bauxite. Since the catalyst per se forms no part of the present invention it will not be described in further detail.

In the reaction step the catalysts are usually contacted with oil at a temperature of about 800 to 1100° F. under such conditions as to effect the desired conversion. After a certain on-stream or residence time in the reactor the catalyst becomes so coated with carbonaceous material that it must be regenerated. The carbonaceous material contains both carbon and hydrogen and since the regeneration is effected by combustion of the carbonaceous deposit, the regeneration gases contain carbon monoxide, carbon dioxide, nitrogen and steam with perhaps small amounts of sulfur dioxide where sulfur compounds were contained in the original charging stock.

Referring to the accompanying drawing, the spent catalyst from a conversion step may be introduced through line 10 at the base of regeneration chamber 11 into which air is injected through line 12. Preferably the catalyst particles range from about 20 to 200 microns in size although smaller or large particle sizes may be used. The regeneration chamber is so designed that the vertical vapor velocity of the gases is about 1 to 10 feet per second, lower velocities being used for finely divided catalyst and higher velocities being used for coarser catalysts. With silica-alumina catalysts averaging about 50 microns in particle size, the vapor velocity may be about 2 to 5 feet per second. The gas contact time in the regenerator may be about 10 to 15 seconds and the catalyst residence time in the reactor due to the tendency of the catalyst to settle therein, may be about 15 to 150 seconds. The temperature of regeneration is generally maintained between about 900 and 1200° F., preferably 1000 to 1100° F., depending largely on the thermal stability of the catalyst employed. External cooling, stage cooling or any other conventional means may be employed to keep the regeneration temperature within safe limits. The regeneration conditions may vary throughout relatively wide limits and the regeneration may be effected in a rotary kiln or in a clay burner of any conventional type.

The hot regeneration gases and regenerated catalyst from chamber 11 are introduced through line 13 to cyclone separator 14. If the catalyst particles are of substantially uniform size and the regeneration is sufficiently complete, the bulk of the catalyst may be withdrawn through lines 15 and 16 and returned through line 17 for further use in the hydrocarbon conversion zone (not shown). If further regeneration of this catalyst is desirable the separated coarse catalyst particles may be introduced through line 18 into second regeneration chamber 19 into which air is introduced by line 20. In this second regeneration chamber a considerable excess of oxygen may be employed in order to insure complete regeneration of the coarser or larger catalyst particles. The hot regeneration gases and regenerated catalyst are then introduced through line 21 to cyclone separator 22 from which regenerated catalyst is returned through line 23 and line 17 for further use in the conversion system. Instead of cyclone separators, I may use other means for effecting initial catalyst separation such as screens, electrical precipitators, settlers, etc. all of which means are herein termed "mechanical."

Regeneration gases containing the finer residual catalyst particles are withdrawn from cyclone separator 14 through line 24 and introduced at a temperature of about 750 to 1050° F. into the base of stripper column 25. Regeneration gases containing an excess of oxygen which are discharged from the top of cyclone separator 22 may be discharged through line 26 through a suitable waste heat boiler, turbine, or other means for recovering heat energy therein. I may, however, close the valve in line 26 and introduce part or all of these gases through line 27 into line 24 leading to the base of stripper 25.

A portion of the gas oil or other feed stock which is to be charged to the conversion step of the system, preferably about 20 to 40% thereof, is introduced through lines 28 and 29 to the top of stripper column 25, preferably at about ordinary atmospheric temperature. As this portion of the feed stock descends through the stripper column countercurrently to the upflowing hot regeneration gases, the more volatile components of the feed stock are removed therefrom and are carried with the regeneration gases through line 30 to the base of scrubber tower 31. The amount so removed in the stripper may be from about 10 to 60 grams, more or less, usually about 25–35 grams. The initial boiling point of the remaining residual fraction is raised by about 100 to 200° F., i. e., to about 500° to 600° F. or higher.

This remaining heavy non-volatile oil passes from the base of stripper column 25 through cooler 32 and line 33 to the top of scrubber 31. The amount of cooling depends upon the volatility of the charging stock and the relative amount thereof which is charged to the stripper. Usually I prefer to introduce the non-volatile oil through line 33 to the top of the scrubber at a temperature of about 100 to 200° F. In some cases the cooler may be unnecessary and the non-volatile oil may be simply by-passed through line 34 and line 33 to the top of the scrubber. Where all the heat in the gases in line 24 is not needed in stripper 25, I may by-pass a portion of the hot gases through line 24a directly to scrubber 31.

Another fraction of the feed stock, which may constitute all of the remaining feed stock, is introduced through line 35 to an intermediate point of scrubbing tower 31. This relatively cold charging stock condenses most of the hydrocarbons which were vaporized in stripper 25 and introduced into the base of the scrubber through line 30. Any uncondensed volatile hydrocarbons remaining in the gases in the upper part of the tower are absorbed by the non-volatile oil which is introduced through line 33. By using this relatively non-volatile stripped charging stock in the top of the scrubber tower 31 I may operate this tower at a sufficiently high temperature to effect the removal of steam as well as $CO$, $CO_2$, $N_2$, etc. through line 36. The hot oil leaving the base of the scrubber through line 37 will contain all of the catalyst removed from the regeneration gases introduced from line 24 and this hot catalyst-containing oil is then passed through line 38 to a suitable pipe still for heating to conversion temperatures. That portion of the feed stock which is not required for the stripping and scrubbing steps is by-passed directly through line 39 to line 38. In fact, line 35 may be closed entirely and all scrubbing in 31 be effected by the oil descending from the absorber zone in the top of 31.

Stripper column 25 and scrubber 31 may be provided with suitable baffles or bubble plates and it should be understood that instead of using simple towers as shown in the drawings, other suitable apparatus may be employed for effecting the desired stripping, scrubbing and absorption steps. It is essential, however, that the stripping step remove the more volatile components of the charging stock, that the scrubbing step condense the bulk of the vaporized hydrocarbons and that the absorption step prevent the losses of volatile hydrocarbons with exit regeneration gases. The stripped feed used in the absorber section at the top of 31 should contain substantially no constituents volatile at the conditions prevailing therein. The stripping step may be effected by indirect instead of direct contact in which case the catalyst is removed from the gases solely in the scrubbing zone instead of partly in the stripping zone. The absorption zone in any case will remove the final traces of catalyst as well as the more volatile hydrocarbons from the exit regeneration gases.

I claim:

1. In a catalytic conversion system wherein carbonaceous material is deposited on catalyst in a reaction zone and is subsequently burned from said catalyst in a regeneration zone, the method of separating regenerated catalyst from hot regeneration gases which comprises mechanically separating most of the catalyst from the hot regeneration gases, stripping the remainder of the catalyst from the hot regeneration gases by scrubbing said gases with at least a part of the incoming charging stock to said system, and contacting the scrubbed gases with a non-volatile absorber oil characterized by a low vapor pressure for preventing losses of vaporized charging stock with regeneration gases.

2. In a catalytic hydrocarbon conversion system wherein the catalyst becomes coated with a carbonaceous deposit in a reaction zone and is regenerated by the combustion of said deposit in a regeneration zone at a temperature of about 1000° F. and wherein the bulk of the regenerated catalyst is mechanically separated from the hot regeneration gases for reuse, the method of recovering residual amounts of catalyst from hot regeneration gases which comprises countercurrently scrubbing said gases with at least a portion of the stock charged to the reaction zone and countercurrently contacting the scrubbed gases with a non-volatile hydrocarbon oil of low vapor pressure, said scrubbing and said contact with absorber oil being at sufficiently high temperature and low pressure to permit the removal of water in vapor form with scrubbed gases.

3. The method of removing the last traces of catalyst from hot catalyst regeneration gas which comprises introducing said gas at the base of a stripping zone, introducing hydrocarbon oil containing light and heavy components at the top of said stripping zone, withdrawing gases and the lighter vaporized components of the hydrocarbon oil from the top of the stripping zone to the bottom of a scrubbing zone, withdrawing the heavier relatively non-volatile fractions of the hydrocarbon oil from the base of said stripping zone and introducing it into the top of said scrubbing zone, introducing a scrubbing oil at an intermediate point in said scrubbing zone, withdrawing gases from the top of said scrubbing zone and withdrawing hydrocarbon oil together with recovered catalyst from the base of said scrubbing zone.

4. In a system for converting normally liquid hydrocarbon charging stocks into high quality motor fuels by heating said charging stocks to a temperature of about 800 to 1100° F., contacting said heated charging stock with a powdered catalyst for converting substantial amounts thereof into high quality motor fuel, the catalyst becoming coated with a carbonaceous deposit during said conversion step and separating said coated catalyst from hydrocarbon vapors, the method of recovering the spent catalyst for reuse which method comprises regenerating said separated catalyst by the introduction of air for effecting the combustion of carbonaceous deposits therefrom at a temperature not exceeding about 1100° F. whereby hot regeneration gases are produced, mechanically separating most of the regenerated catalyst from the hot regeneration gases and returning the separated catalyst to said contacting step, stripping at least a portion of the charging stock with said hot regeneration gases to remove the more volatile fractions of said charging stock from a heavy non-volatile charging stock fraction, condensing volatile charging stock components from said stripping step and countercurrently contacting hot regeneration gases from said stripping step with the non-volatile fraction of the charging stock from said stripping step at such temperature and pressure that any water vapors in said regeneration gas remains in vapor form in said scrubbing step while substantially all volatile hydrocarbons associated with said regeneration gases are removed therefrom in said scrubbing step.

5. The method of claim 4 which includes the step of cooling the non-volatile fraction of the charging stock as it leaves said stripping step and before it is introduced into said scrubbing step.

6. The method of recovering heat and catalyst particles from hot regeneration gas by means of a relatively cold hydrocarbon feed stock which method comprises passing a part of said feed stock through a stripping zone countercurrent to a stream of hot catalyst containing regeneration gas at such temperature and pressure that the feed stock in said stripping zone is fractionated into relatively volatile and relatively non-volatile fractions, introducing the gases and relatively volatile fraction from the stripping zone to the base of a scrubbing zone, contacting the regeneration gas and relatively volatile hydrocarbons from the stripping zone with a portion of the cold feed stock for condensing the major portion of the vaporized volatile hydrocarbons and for further cooling said gases, cooling the non-volatile fraction of the charging stock leaving said stripping zone and scrubbing gases from said scrubbing zone with said cooled non-volatile hydrocarbons for preventing undue losses of volatile hydrocarbons with exit regeneration gases.

7. The method of regenerating and recovering catalyst material which has become coated with a carbonaceous deposit in a hydrocarbon conversion process which method comprises introducing air and catalyst into a first regeneration zone while maintaining said regeneration zone at a temperature of about 900 to 1100° F., limiting the amount of introduced air to prevent an excess of oxygen in regeneration gas from said zone whereby the very fine catalyst particles are substantially completely regenerated while the larger catalyst particles are not completely regenerated, centrifugally separating the regeneration gas and fine catalyst particles from coarse catalyst particles leaving said first regeneration zone, scrubbing said separated regeneration gases with incoming feed stock for recovering both catalyst and heat from said gases which are substantially free from excess oxygen, introducing the larger catalyst particles from said separation step into a second regeneration zone maintained at a temperature of about 900 to 1100° F., introducing an excess of air into said second regeneration zone for substantially completing the regeneration of heavier catalyst particles therein, separating the said particles from said regeneration gas containing an excess of oxygen and returning said regenerated catalyst from the second regeneration step for effecting further conversion of charging stock containing recovered lighter catalyst particles.

8. The method of claim 7 wherein the separated regeneration gas from the second regeneration zone is vented from the system and only the regeneration gas from the first regeneration zone is scrubbed with incoming feed stock.

9. In a catalyst regeneration and recovery system the method of recovering regenerated catalyst fines in incoming feed stock without contaminating said feed stock with oxygen which method comprises regenerating catalyst in a first zone under conditions to produce a regeneration gas which is free from excess oxygen, separating said regeneration gas together with catalyst fines from coarser catalyst material, scrubbing catalyst fines from said separated regeneration gas by scrubbing with incoming feed stock, further regenerating coarser catalyst particles in a second regeneration zone under conditions for producing an excess of oxygen in the regeneration gas, removing said regeneration gas from coarser catalyst particles and returning the coarser catalyst particles to the reaction zone for further conversion of the feed stock containing recovered catalyst fines.

VANDERVEER VOORHEES.